United States Patent [19]

Tanaka et al.

[11] Patent Number: 5,034,240
[45] Date of Patent: Jul. 23, 1991

[54] PROCESS FOR THE PRODUCTION OF ROLL-IN FAT CONTAINING SOLID COMPONENT

[75] Inventors: Shinji Tanaka; Yasuo Okutomi, both of Tokyo, Japan

[73] Assignee: Asahi Denka Kogyo Kabushiki Kaisha, Tokyo, Japan

[21] Appl. No.: 486,788

[22] Filed: Mar. 1, 1990

[30] Foreign Application Priority Data

Mar. 24, 1989 [JP] Japan .................................. 1-73239

[51] Int. Cl.$^5$ .............................................. A23D 9/02
[52] U.S. Cl. .................................... 426/607; 426/601; 426/603
[58] Field of Search ................. 426/603, 607, 601, 417

[56] References Cited

U.S. PATENT DOCUMENTS

| 3,892,880 | 7/1975 | Grolitsch | 426/607 |
| 4,546,003 | 10/1985 | Izzo et al. | 426/603 |
| 4,652,458 | 3/1987 | Frost et al. | 426/607 |
| 4,891,233 | 1/1990 | Belanger et al. | 426/94 |

FOREIGN PATENT DOCUMENTS

| 62-190044 | 8/1987 | Japan | 426/603 |
| 63-309153 | 12/1988 | Japan | 426/603 |

Primary Examiner—Donald E. Czaja
Assistant Examiner—D. Workman
Attorney, Agent, or Firm—Frishauf, Holtz, Goodman & Woodward

[57] ABSTRACT

A process for the production of a roll-in fat containing a solid component which comprises mixing an oleaginous material, which has been solidified by cooling and then a finely divided, with finely divided solid component not or hardly soluble in said oleaginous material and kneading the obtained mixture under reduced pressure.

21 Claims, No Drawings

PROCESS FOR THE PRODUCTION OF ROLL-IN FAT CONTAINING SOLID COMPONENT

BACKGROUND OF THE INVENTION

Field of the Invention

This invention relates to a roll-in fat containing a solid component. The roll-in fat of the present invention contains the solid component homogeneously dispersed therein, and is excellent in plasticity and extensibility. Thus it is widely applicable to, for example, various pies, croissants and Danish pastries.

Description of the Prior Art

A conventional method for adding to an oleaginous material such as margarine or shortening a solid material which is not or hardly soluble in oil or water, for example, dairy products such as cheese, gums, fruits, vegetables, seaweeds, fibrous materials, various starches, baking powder, gluten, soybean protein, cereals such as corn, flat plant, sesame, wheat flour or rye, sugars, solid enzymes or nuts such as almond, peanut, cacao or cocoa powder comprises forcing said solid component to disperse in a molten material in the production of said oleaginous material followed by plasticization by cooling. Alternately, the oleaginous material produced in a conventional manner is brought to a semimolten state so as to facilitate the mixing of the same with a solid component and then the solid component is incorporated therein.

For example, Japanese Patent Laid-Open No. 122765/1979 discloses a process for the production of an edible animal or vegetable solid fat containing cheese. This process comprises heating an edible animal or vegetable solid fat such as margarine or butter so as to make it fluid and then adding cheese thereto.

Furthermore, Japanese Patent Publication No. 46291/1983 discloses an edible solid fat which contains starch or α-starch and has a plasticity. As the Examples show, this product is also produced by melting a fat at 60° C. and then adding starch or α-starch thereto.

However it is difficult to homogeneously disperse an insoluble or hardly soluble solid component in the molten material for the production of an oleaginous material followed by cooling and plasticization, as conducted in the cases of the above-mentioned patents, since the difference in the specific gravity between the oleaginous material and the solid component would frequently cause the separation of these materials from each other during the production process. For example, a hardly soluble solid component such as cheese would agglomerate together during the dispersion. As a result, it becomes far more nonuniform, which makes it impossible to obtain a roll-in fat containing homogeneously dispersed solid components.

When an oleaginous material is brought to a semimolten state in order to facilitate the subsequent mixing step and then a solid component is added thereto, as proposed by the above-mentioned Japanese Patent Publication No. 46291/1983, it is difficult to control the temperature of said oleaginous material and thus some troubles such as oil-off (namely, the effusion of components in the fat having a low melting point) might be observed. Furthermore, the semimelting is accompanied by some changes in the crystalline structure of the fat and thus the plasticity of the product is damaged, which makes the resulting product considerably unsatisfactory as a roll-in fat containing solid components.

SUMMARY OF THE INVENTION

It is an object of the present invention to provide a process for the production of a roll-in fat which contains a solid component homogeneously dispersed therein, is excellent in plasticity and extensibility and thus never suffers from the above-mentioned problems.

The object of the present invention has been achieved by providing a process for the production of a roll-in fat which comprises mixing an oleaginous material, which has been solidified by cooling and then being finely divided, with a finely divided solid component and kneading these materials under reduced pressure.

The process of the present invention for the production of a roll-in fat containing a solid component exerts the following effects.

The roll-in fat containing a solid component obtained by the process of the present invention contains the solid component homogeneously dispersed therein and is excellent in plasticity and extensibility. Thus it can be used within a wide temperature range and has a smooth texture.

Further, the process of the present invention requires neither dispersing the solid component in the raw materials for the production of an oleaginous material nor bringing an oleaginous material to a semimolten state prior to the incorporation of a solid component. Thus it shows an improved workability.

Furthermore, the use of the roll-in fat containing a solid component obtained by the process of the present invention makes it possible to result in a final product having an improved taste and being preferable from the viewpoint of sanitation.

DETAILED DESCRIPTION OF THE INVENTION

Examples of the oleaginous material solidified by cooling to be used in the present invention include emulsified fats such as margarine and fat spread, as well as cooled and solidified fats, such as shortening. It is preferable that this oleaginous material is one substantially free from being plasticized after the cooling and solidification.

The oily phase-forming material in the oleaginous material may be one or more substances selected from the group consisting of natural fats such as palm oil, soybean oil, rapeseed oil, rice bran oil, sunflower oil, safflower oil, beef tallow, milk fat, lard, cacao fat, fish oil, and whale oil as well as processed oils obtained by subjecting these natural fats to one or more treatments such as hydrogenation, fractionation or transesterification. Various fat-soluble additives such as fat-soluble emulsifiers, fat-soluble antioxidants, fat-soluble colorants and fat-soluble perfumes may be added to these fats, if required.

The aqueous phase-forming material in the emulsified fat to be used as said oleaginous material, such as margarine or fat spread, may be water to which various water-soluble materials, for example, whole-fat milk, defatted milk, common salt, water-soluble perfumes, maltose, isomerized sugars, sucrose, sorbitose, starch syrup and reducing sugar starch syrup may be optionally added.

The solidification of the above-mentioned oleaginous material by cooling may be conducted after mixing these oily phase-forming and aqueous phase-forming materials together followed by emulsification(in the case of emulsified fats such as margarine or fat spread). It may be carried out by using, for example, a tubular cooler or an open cooler employed in the production of margarine or shortening. Examples of the closed continuous cooler include a Kombinator cooling tube (mfd. by SCHRÖDER & Co.), a Votator A-unit (mfd. by Votator Co.) and a Perfector cooling tube (mfd. by GERSTENBERG & AGGER A/S), while those of the open cooler include a cooling drum (DiaCooler: mfd. by GERSTENBERG & AGGER A/S). It is preferable to use the cooling drum, namely, the open cooler, in the solidification by cooling in the process of the present invention. This is because the oleaginous material, such as margarine or shortening, adhering to the drum in the form of a thin film is cooled and solidified during one turn of the drum and finally scraped with a scraper in the form of a thin piece, so that the solidification and thinning (fine dividing) of the oleaginous material can be continuously conducted by using one and the same device.

In order to achieve a good extensibility suitable for a roll-in fat, it is preferable not to pass the oleaginous material through a B Unit, which imparts a plasticity to the material, equipped in the abovementioned Combinator, Votator and Perfecter.

The oleaginous material, such as margarine or shortening, thus solidified by cooling is then treated with a cutting device such as a slicer or a cutter or a mill. Alternately it may be passed through a perforated plate. Thus it is finely divided into, for example, powder, granules, thin pieces, strap, strip, fibers, noodles, flakes, cubes, spheres, rectangles or irregular shapes.

The size of the finely divided oleaginous material may be appropriately determined depending on the type and properties of the fat and the solid component to be mixed therewith, so long as said oleaginous material is not be melted in the mixing stage at room temperature or lower.

The mixing of the oleaginous material, which has been solidified by cooling and then finely divided, with a finely divided solid component not or hardly soluble therein may be arbitrarily conducted, so long as the oleaginous material and the solid component can be appropriately mixed together.

Examples of the above-mentioned solid component include dairy products such as cheese, gums, fruits, vegetables, seaweeds, fibrous materials, various starches, baking powder, gluten, soybean protein, cereals such as corn, flat plant, sesame, wheat flour and rye, sugars, solid enzymes and nuts such as almond, peanut, cacao and cocoa powder. The solid component may be appropriately selected by considering the taste and other properties of the desired final roll-in fat product.

Among these solid components, those which have been preliminarily divided into fine pieces, for example, granulated sugar or cocoa powder may be mixed with the oleaginous material as such. On the other hand, undivided solid components such as cheese may be finely divided by treatment with a cutting device such as a slicer or a cutter or a mill or by passing the cheese through a perforated plate.

The solid component thus finely divided may be in the form of, for example, powder, granules, thin pieces, strap, strip, fibers, noodles, flakes, cubes, spheres, rectangles or irregular shapes.

The size of the finely divided solid component may vary depending on the type and form of the solid component to be used. It is preferable that the particle size thereof does not exceed 20 mm.

The amount of the solid component to be added may vary depending on the taste of the final product, to which the roll-in fat is to be applied, and the form and properties of the solid component to be used. Generally speaking, it may be preferably used in an amount of from 0.1 to 80% by weight based on the final roll-in fat product. When the content of the solid component exceeds 80% by weight, the binding force between the fats would be weakened, which makes it difficult to give a roll-in fat excellent in plasticity and extensibility.

It is preferable that the above-mentioned oleaginous material is not substantially melted in the steps of finely dividing, mixing with the solid component and kneading under reduced pressure.

The mixture of the oleaginous material with the solid component thus obtained is then kneaded under reduced pressure by using, for example, a Complector (mfd. by GERSTENBERG & AGGER A/S). Thus the roll-in fat containing the solid component homogeneously dispersed therein can be produced.

The kneading may be conducted under a pressure of below 760 mmHg. preferably below 500 mmHg and still preferably below 200 mmHg.

The inlet temperature of the complector varies depending on the melting point of the fat and the solid fat content. It generally ranges from 1° to 25° C. where the oleaginous material is apparently in an unmelted state.

EXAMPLES

To further illustrate the present invention, the following Examples and Comparative Examples will be given.

EXAMPLE 1 AND COMPARATIVE EXAMPLE 1

15 parts by weight of hardened fish oil (m.p.: 45° C.), 40 parts by weight of beef tallow, 30 parts by weight of lard and 15 parts by weight of soybean oil were combined together and 0.5 part by weight of fatty acid monoglyceride and 0.5 part by weight of soybean lecithin were added thereto. The resulting mixture was thoroughly stirred at 60° C. to thereby give an oily phase. To this oily phase was slowly added 20 parts by weight of water, and the mixture was emulsified under stirring and then solidified by cooling in a cooling drum so as to give margarine flakes. 80 parts by weight of this flaky margarine was blended with 20 parts by weight of cheese powder (particle size approximately 1 mm). The obtained mixture was kneaded in a complector (inlet temperature: 15° C.) under reduced pressure (150 mmHg). Thus a roll-in fat containing cheese powder [invention product (1)] was obtained.

For comparison, a margarine was produced by using a conventional cooling drum and complector and then softened at 25° C. for 24 hours. Next, a cheese powder was added thereto at the same ratio as the one described in Example 1 with a vacuum kneader. Thus a roll-in fat containing cheese powder [comparative product (1)] was obtained.

EXAMPLE 2 AND COMPARATIVE EXAMPLE 2

The same margarine as the one used in Example 1 was cooled with a Combinator A Unit and solidified with a resting tube. Then it was extruded through a perforated plate provided at the outlet of the resting tube to thereby give a noodle-like product.

To 60 parts by weight of this margarine was added 40 parts by weight of a cocoa powder. The obtained mixture was kneaded in a complector (inlet temperature :5° C.) under reduced pressure (150 mmHg) to thereby give a roll-in fat containing cocoa powder [invention product (2)].

For comparison, the same margarine as the one used in Example 1 was softened at the same temperature and for the same period as ones described in Example 1 and the cocoa powder was added thereto at the same ratio as the one described in Example 2. Thus a roll-in fat containing cocoa powder [comparative product (2)] was obtained.

Generally speaking, a roll-in fat showing little changes in yield value in various temperature zones is preferable, and it is reported that an appropriate yield value of a roll-in fat (described as a fat for puff pastry) ranges from 800 to 1600 g/cm$^2$ [cf. Journal of American Oil Chemist's Society, 36, Aug. 345-348 (1959)].

The yield values of the roll-in fats produced in the Examples 1 and 2 and Comparative Examples 1 and 2 at various temperatures were measured with a Rheo meter (mfd. by Fudo Kogyo K.K.). Table 1 shows the results. Further Table 2 shows the temperature range where each roll-in fat shows a yield value appropriate for a roll-in fat.

TABLE 1

| Temp. (°C.) | Yield value at various temperatures (g/cm$^2$) | | | |
|---|---|---|---|---|
| | Invention product 1 | Comparative product 1 | Invention product 2 | Comparative product 2 |
| 10 | 1780 | 2672 | 3446 | 4590 |
| 15 | 920 | 405 | 1380 | 2160 |
| 20 | 435 | 100 | 748 | 350 |
| 25 | 152 | 58 | 248 | 104 |

TABLE 2

| | Temperature range of appropriate yield value (800-1600 g/cm$^2$) | | | |
|---|---|---|---|---|
| | Invention product 1 | Comparative product 1 | Invention product 2 | Comparative product 2 |
| Temp. range (°C.) | 11.0~16.5 | 12.5~14.0 | 14.5~19.5 | 17.0~19.0 |

Table 1 indicates that the invention products 1 and 2 show little changes in the yield value as compared with the comparative products. Further, Table 2 indicates that the invention products show broader temperature ranges of yield value suitable for a roll-in fat than the comparative ones do. Namely, it is confirmed that the roll-in fat produced by the process of the present invention would show a plasticity within a broader temperature range than a conventional one does. Thus the former shows an improved workability and obviously facilitates the production procedure.

Further, pies were produced at 13° C., at which the yield value of the invention product (1) was nearly the same as that of the comparative product (1) (1300 g/cm$^2$). As a result, the invention product (1) was thinly and uniformly spread in the dough and showed good lifting while the comparative product (1) showed a less uniformity and poor lifting. A pie produced by using the invention product (1) containing cheese powder and the one produced by using the invention product (2) containing cocoa powder showed an excellent cheese taste and an excellent cocoa taste, respectively.

EXAMPLE 3 AND COMPARATIVE EXAMPLE 3

The procedures of Example 1 and Comparative Example 1 were repeated so as to give roll-in margarines containing 70 parts by weight of the margarine and 30 parts by weight of granulated sugar [invention product (3) and comparative product (3)].

Table 3 shows the results of the determination of the yield values of these roll-in margarines at various temperature. Table 3 obviously indicates that the invention product (3) is superior to the comparative product (3).

EXAMPLE 4 AND COMPARATIVE EXAMPLE 4

The procedures of Example 1 and Comparative Example 1 were repeated so as to give roll-in margarines containing 85 parts by weight of the margarine and 15 parts by weight of peanuts ground to give a particle size of 2 to 3 mm [invention product (4) and comparative product (4)].

Table 3 shows the results of the determination of the yield values of these roll-in margarines at various temperature. Table 3 obviously indicates that the invention product (4) is superior to the comparative product (4).

EXAMPLE 5 AND COMPARATIVE EXAMPLE 5

The procedures of Example 1 and Comparative Example 1 were repeated so as to give roll-in margarines containing 99.9 parts by weight of the margarine and 0.1 part by weight of thermally stable amylase [invention product (5) and comparative product (5)].

Table 3 shows the results of the determination of the yield values of these roll-in margarines at various temperature. Table 3 obviously indicates that the invention product (5) is superior to the comparative product (5).

EXAMPLE 6 AND COMPARATIVE EXAMPLE 6

15 parts by weight of hardened fish oil (m.p. : 45° C.), 40 parts by weight of beef tallow, 30 parts by weight of lard and 15 parts by weight of soybean oil were combined together and 0.5 part by weight of fatty acid monoglyceride and 0.5 part by weight of soybean lecithin were added thereto. The resulting mixture was thoroughly stirred at 60° C. and then solidified by cooling in a cooling drum to thereby give a filmy shortening. 99.5 parts by weight of this shortening was mixed with 0.5 part by weight of baking powder and the obtained mixture was kneaded with a complector, similar to the procedure of Example 1. Thus a roll-in shortening containing baking powder [invention product (6)] was obtained.

For comparison, a shortening was softened in the same manner as the one described in Comparative Example 1. Then a baking powder was added thereto at the same ratio as the one described in Example 6. Thus a roll-in shortening containing baking powder [comparative product (6)] was obtained.

Table 3 shows the yield values of these shortenings at various temperatures. As Table 3 indicates, the invention product (6) was superior to the comparative product (6).

TABLE 3

| Temp. (°C.) | Yield value at various temperatures (g/cm$^2$) | | | | | | | |
|---|---|---|---|---|---|---|---|---|
| | Invention product 3 | Comparative product 3 | Invention product 4 | Comparative product 4 | Invention product 5 | Comparative product 5 | Invention product 6 | Comparative product 6 |
| 10 | 1890 | 2930 | 1950 | 2860 | 1690 | 2550 | 2560 | 3675 |

TABLE 3-continued

| | Yield value at various temperatures (g/cm²) | | | | | | | |
|---|---|---|---|---|---|---|---|---|
| Temp. (°C.) | Invention product 3 | Comparative product 3 | Invention product 4 | Comparative product 4 | Invention product 5 | Comparative product 5 | Invention product 6 | Comparative product 6 |
| 15 | 1045 | 450 | 980 | 430 | 870 | 390 | 1450 | 1900 |
| 20 | 505 | 115 | 470 | 105 | 420 | 100 | 680 | 280 |
| 25 | 175 | 65 | 145 | 60 | 135 | 58 | 185 | 40 |

What is claimed is:

1. A process for the production of a roll-in fat containing a solid component which comprises mixing an oleaginous material, which has been solidified by cooling and then finely divided, with a finely divided solid component, said solid component being not soluble or hardly soluble in said oleaginous material, and kneading the obtained mixture under reduced pressure.

2. The process for the production of a roll-in fat containing a solid component as claimed in claim 1, wherein said reduced pressure is below 760 mmHg.

3. The process for the production of a roll-in fat containing a solid component as claimed in claim 1, wherein the amount of said solid component is 0.1 to 80% by weight based on the roll-in fat.

4. The process for the production of a roll-in fat containing a solid component as claimed in claim 1, wherein said finely divided solid component has a particle size of 20 mm or below.

5. The process for the production of a roll-in fat containing a solid component as claimed in claim 1, wherein the oleaginous material is an emulsified fat.

6. The process for the production of a roll-in fat containing a solid component as claimed in claim 5, wherein the emulsified fat is selected from the group consisting of fat spread and shortening.

7. The process for the production of a roll-in fat containing a solid component as claimed in claim 1, wherein the oleaginous material comprises an oily phase-forming material selected from the group consisting of palm oil, soybean oil, rapeseed oil, rice bran oil, sunflower oil, safflower oil, beef tallow, milk fat, lard, cacao fat, fish oil, whale oil and mixtures thereof.

8. The process for the production of a roll-in fat containing a solid component as claimed in claim 1, wherein the oleaginous material is an emulsified fat comprising an aqueous phase-forming material, said aqueous phase-forming material comprises water to which a water-soluble material is added, said water-soluble material being selected from the group consisting of whole-fat milk, defatted milk, common salt, water-soluble perfumes, maltose, isomerized sugars, sucrose, sorbitose, starch syrup and reducing sugar starch syrup.

9. The process for the production of a roll-in fat containing a solid component as claimed in claim 1, wherein the solification by cooling and finely dividing of the oleaginous material is conducted in a cooling drum.

10. The process for the production of a roll-in fat containing a solid component as claimed in claim 1, wherein the oleaginous material is finely divided into a powder, strips, fibers, spheres, rectangles or irregular shapes.

11. The process for the production of a roll-in fat containing a solid component as claimed in claim 1, wherein the solid component is selected from the group consisting of cheese, gums, fruits, vegetables, seaweeds, starches, baking powder, gluten, soybean protein, corn, flat plant, sesame, wheat flour, rye, sugars, solid enzymes, nuts and cacao powder.

12. The process for the production of a roll-in fat containing a solid component as claimed in claim 11, wherein the solid component has a particle size not exceeding 20 mm and is in an amount of 0.1 to 80% by weight based on the weight of the roll-in fat containing a solid component.

13. The process for the production of a roll-in fat containing a solid component as claimed in claim 12, wherein the kneading is conducted at a pressure below 760 mmHg.

14. The process for the production of a roll-in fat containing a solid component as claimed in claim 13, wherein the pressure is below 500 mmHg.

15. The process for the production of a roll-in fat containing a solid component as claimed in claim 13, wherein the pressure is below 200 mmHg.

16. The process for the production of a roll-in fat containing a solid component as claimed in claim 2, wherein said solid component is in an amount of 0.1 to 80% by weight based on the weight of the roll-in fat containing a solid component and said finely divided solid component has a particle size of 20 mm of below.

17. The process for the production of a roll-in fat containing a solid as claimed in claim 16, wherein the oleaginous material is an emulsified fat selected from the group consisting of fat spread and shortening.

18. The process for the production of a roll-in fat containing a solid component as claimed in claim 1, wherein the solid component comprises fibrous material.

19. The process for the production of a roll-in fat containing a solid as claimed in claim 16, wherein the oleaginous material is margarine.

20. The process for the production of roll-in fat containing a solid component as claimed in claim 1, wherein the oleaginous material is in a form of a flake, cube, strap or granule.

21. The process for the production of roll in fat containing a solid component as claimed in claim 5, wherein the emulsified fat is a margarine.

* * * * *

UNITED STATES PATENT AND TRADEMARK OFFICE
CERTIFICATE OF CORRECTION

PATENT NO. : 5,034,240

DATED : July 23, 1991

INVENTOR(S) : TANAKA et al

It is certified that error appears in the above-identified patent and that said Letters Patent is hereby corrected as shown below:

TITLE PAGE -

In Section [56] References Cited, insert the following:

Under U.S. PATENT DOCUMENTS 4,145,452   3/1979   Cousin et al
4,156,743   5/1979   Schmitt Under FOREIGN PATENT DOCUMENTS 499 149   4/1979   Australia Under OTHER DOCUMENTS KANEGAFUCCHI CHEM. IND. CO. LTD., "Production of Food Processed With Oil or Fat", 3/88, (C-482)(2931), Vol.12, No.84, JP 62 220 146, JAPANESE PATENT ABSTRACTS.

UNITED STATES PATENT AND TRADEMARK OFFICE
CERTIFICATE OF CORRECTION

PATENT NO. : 5,034,240
DATED : July 23, 1991
INVENTOR(S) : TANAKA et al

It is certified that error appears in the above-identified patent and that said Letters Patent is hereby corrected as shown below:

SAN EI CHEM IND. LTD., "Fat- or Oil-Containing Product" 2/89 (C-571(3427), Vol. 13, NO. 79, JP 63 269 947, JAPANESE PATENT ABSTRACTS.

Insert Under <u>OTHER DOCUMENTS</u>

KANEBO LTD. "Forous Chocolate and Preparation Thereof", 2/89, (C-567)(3409), Vol. 13, No.61 JP 63 251 048, JAPANESE PATENT ABSTRACTS.

Signed and Sealed this

Tenth Day of August, 1993

*Attest:*

MICHAEL K. KIRK

*Attesting Officer*   Acting Commissioner of Patents and Trademarks